(12) United States Patent
Ohta et al.

(10) Patent No.: US 6,182,000 B1
(45) Date of Patent: Jan. 30, 2001

(54) CONTROL SYSTEM FOR TRANSMISSIONS

(75) Inventors: Takashi Ohta; Kunihiro Iwatsuki, both of Aichi (JP)

(73) Assignee: Toyota Jidosha Kabushiki Kaisha, Toyota (JP)

(*) Notice: Under 35 U.S.C. 154(b), the term of this patent shall be extended for 0 days.

(21) Appl. No.: 08/992,080

(22) Filed: Dec. 17, 1997

(30) Foreign Application Priority Data

Dec. 24, 1996 (JP) .................................................... 8-355567

(51) Int. Cl.$^7$ .............................. G06F 7/00; G06F 17/00; G06F 19/00
(52) U.S. Cl. .............................. 701/55; 701/70; 701/200; 701/96; 701/53; 701/95; 180/179; 180/170
(58) Field of Search ................... 701/55, 96, 53, 701/70, 95, 200; 180/179, 170

(56) References Cited

U.S. PATENT DOCUMENTS

| | | | |
|---|---|---|---|
| 4,933,859 | * 6/1990 | Tsuyama et al. | 701/93 |
| 5,010,490 | * 4/1991 | Naito et al. | 701/95 |
| 5,038,880 | * 8/1991 | Matusoka et al. | 180/179 |
| 5,128,869 | * 7/1992 | Akishino et al. | 701/97 |
| 5,146,219 | 9/1992 | Zechnall | 340/995 |
| 5,148,721 | * 9/1992 | Anan et al. | 701/583 |
| 5,257,188 | * 10/1993 | Sakakibara et al. | 701/53 |
| 5,315,295 | 5/1994 | Fuji | 340/936 |
| 5,485,161 | 1/1996 | Vaughn | 342/357 |
| 5,504,482 | 4/1996 | Schreder | 340/995 |
| 5,598,335 | * 1/1997 | You | 701/65 |
| 5,695,020 | * 12/1997 | Nishimura | 180/169 |
| 5,749,063 | * 5/1998 | Sakonjyu et al. | 701/93 |
| 5,771,007 | * 6/1998 | Arai et al. | 340/903 |
| 5,832,400 | 11/1998 | Takahashi et al. | 701/53 |
| 5,835,008 | * 11/1998 | Colemere, Jr. | 340/439 |
| 5,839,534 | * 11/1998 | Chakraborty et al. | 180/169 |
| 5,884,208 | * 3/1999 | Byon | 701/110 |
| 5,890,991 | * 4/1999 | Sakakiyama | 477/48 |
| 5,893,894 | 4/1999 | Moroto et al. | 701/53 |
| 5,902,345 | * 5/1999 | Minowa et al. | 701/96 |
| 5,913,377 | * 6/1999 | Ota et al. | 180/244 |
| 5,945,799 | * 8/1999 | Shimizu | 318/587 |
| 5,952,939 | * 9/1999 | Nakazawa et al. | 340/903 |
| 6,032,095 | * 2/2000 | Ochi et al. | 701/51 |
| 6,032,098 | 2/2000 | Takahashi et al. | 701/210 |
| 6,070,682 | * 6/2000 | Isogai et al. | 180/167 |

FOREIGN PATENT DOCUMENTS

| | | |
|---|---|---|
| 0 745 788 | 12/1996 | (EP) . |
| 0 752 548 | 1/1997 | (EP) . |
| 6-135349 | 5/1994 | (JP) . |
| 5-262251 | 12/1994 | (JP) . |

OTHER PUBLICATIONS

U.S. Ser. No. 08/992,082, Control system for vehicles filed Dec. 17, 1997.

* cited by examiner

Primary Examiner—William A. Cuchlinski, Jr.
Assistant Examiner—Olga Hernandez
(74) Attorney, Agent, or Firm—Kenyon & Kenyon

(57) ABSTRACT

A control system for an automatic transmission includes a route information detector which detects route information for the vehicle and a transmission which is controlled by the route information detector. The control system also includes a device for detecting the places where it is necessary to decrease speed in the determined traveling distance, a device for calculating the vehicle target speed for each corner, a device for calculating the required vehicle speed at the present position of the vehicle to decrease present vehicle speed to the vehicle target speed for the place where it is necessary to decrease speed. And if the target deceleration from the present speed to the required vehicle speeds lager than a threshold value, the place is regarded as the target place, and it is counted as the target place, and the automatic transmission is shifted down.

16 Claims, 8 Drawing Sheets

| | C₀ | C₁ | C₂ | B₀ | B₁ | B₂ | B₃ | B₄ | F₀ | F₁ | F₂ |
|---|---|---|---|---|---|---|---|---|---|---|---|
| N,P | ○ | | | | | | | | | | |
| REV | | | ○ | ○ | | | | ○ | | | |
| 1ST | ○ | ○ | | | | | | ● | ○ | | ○ |
| 2ND | ● | ○ | | | | | ○ | | ○ | | |
| 3RD | ○ | ○ | | | ● | ○ | | | ○ | ○ | |
| 4TH | ○ | ○ | ○ | | | △ | | | ○ | | |
| 5TH | | ○ | ○ | ○ | | △ | | | | | |

CONTROL SYSTEM FOR TRANSMISSIONS

BACKGROUND OF THE INVENTION

1. Field of the invention

This invention is directed to a control device for an automatic transmission, which has plural and non-continuous gear stages, is controlled based on the information regarding the road condition of the route that the vehicle follows. This information is output by a route information detection device.

2. Related Art

Generally, the gear stage of an automatic transmission for a vehicle is automatically controlled by the driving condition of the vehicle, which is detected by various sensors. Although if sensors are used to detect the vehicle driving condition, they can only detect the change of the vehicle driving condition when the vehicle encounters an actual change in road conditions. So, if sensors are used, the driving force is changed by shifting the gear stages after detection of an actual change in the driving condition, which sometimes reduces the drivability and performance of the vehicle. Recently, it has become possible for a route information detection system, for example, a navigation system, to detect in advance information regarding the road condition, on which the vehicle travels, and this information is used to control shifting of the gear stages of an automatic transmission before the road conditions actually change. An example of a vehicle control system is disclosed in Japanese Patent Laid Open Publication No. HEI 7-306998.

In the above mentioned patent, the vehicle control system has a digital map, which stores information on a road map, navigation system, which calculates location of the vehicle on the map, a wheel sensor, which detects the vehicle speed, a predict system, which predicts the route that the vehicle will follow, a driving skills determining system, which determine the driver's skills, an appropriate speed calculating system, which calculates an appropriate speed for the driver based on his driving skills, a comparison system, which compares the calculated appropriate speed and the actual running speed, a vehicle acceleration calculation system that calculates the acceleration that the vehicle should take to make the vehicle travel at said appropriate speed by taking into account the information from the comparison system, continuously variable transmission (CVT), and a transmission control system, which controls a speed ratio of the CVT based on the calculated vehicle acceleration. The above mentioned system takes the following steps when the vehicle road conditions where require deceleration, for example, to enable to go through a curve safely. First of all, the vehicle control system judges whether the driver will be able to through the curve smoothly through the curve at the present speed, the appropriate speed for going smoothly through the curve is calculated. Second of all, the speed plan is determined to decrease the vehicle speed from the present speed to the appropriate speed for going through the curve, and the target speed is determined. Taking into consideration the driver's skills, the vehicle deceleration is calculated to make the present vehicle speed the target speed. The maximum of this deceleration is set so the driver may not feel the deceleration. Consequently, without making the passengers uncomfortable, the vehicle decreases its speed to the appropriate speed for going through the curve before the vehicle reaches the curve, thereby enabling the vehicle to go smoothly through the curve.

Regarding the automatically controlled transmission, in addition to the continuously variable transmission (CVT), there is so called automatic transmission which has plural and non continuous gear stages, consisting of the gear mechanisms and frictional engagement units. The gear stages are non continuous gear ratios, the gear stages are set by engaging one frictional engagement unit and disengaging another frictional engagement unit. When the gear stage of the automatic transmission changed, the frictional engagement units will engage or disengage, which causes shift shock during a shift change.

A vehicle, that has an automatic transmission, with non continuous gear stages, to go through a curve smoothly, should be controlled by decreasing its speed before the curve. It is also desirable to avoid changing the speed ratio during the curve. Although for a vehicle that has an automatic transmission, if the gear stage is changed from a higher stage to a lower stage to decrease the vehicle speed, it is possible that more than one shift changing will continuously occur, and consequently the shift shock of the gear shift changing will occur as well. That's why if the above mentioned invention is applied the same to a vehicle that has automatic transmission, it is impossible to prevent the occurrence of the shock of the speed changing.

SUMMARY OF THE INVENTION

One object of the present invention is to provide an automatic transmission control system that is able to decrease the number of gear stage shifts as much as possible, when the vehicle, goes through a curve. A control system built according to the present invention is described in the following. The traveling distance to zero the vehicle is determined if the vehicle decreases its speed from the present speed by the predetermined decreasing speed. The number of corners, which are regarded as the places where it is necessary to decrease speed, are detected in the determined traveling distance. The vehicle target speed Vt is calculated for each corner. Vt is set for maintaining proper behavior of the vehicle, stability of operation, and good drivability if the vehicle rounds the corner. The required vehicle speed Vi at the present position of the vehicle calculated to decrease present vehicle speed V to the vehicle target speed Vt for the specific corner. Vi is calculated on the basis of the distance between the present position of the vehicle and each corner. The target deceleration from the present speed V to the required vehicle speed Vi of the specific corner is lager than the threshold value, the specific corner is regarded as the target corner It, and it is counted as the target corner It. The target corner needs the automatic transmission 2 to shift down.

In the invention, if there is more than one corner where vehicle is not able to decreases its speed to the vehicle target speed Vt at a rate less than the target deceleration; and the distance from the present position to the immediate corner is less than the threshold value; and the present vehicle speed V is more than the vehicle target speed Vt; and the vehicle is on the straight road; it is regarded that there is little possibility to accelerate before entering the target corner, the deceleration of the vehicle or the shift down makes little influence against the behavior of the vehicle, stability of the vehicle, and the drivability, then more than one gear stage will be executed.

According to the invention, when the corner is detected on the road ahead of the present position by the navigation system, the gear stage is shifted down only if the deceleration from the present vehicle speed to the required vehicle speed Vi is more than the threshold value. The shifting down of the gear stage is aimed towards getting engine brake effect easily. So it is possible that when the criteria are satisfied, the automatic transmission is controlled in order to get engine brake effect.

DETAILED DESCRIPTION

The entire disclosure of Japanese Patent Application HEI 8-355567 filed on Dec. 24, 1996, including specification, claims drawings, and summary is incorporated herein by reference in their entirety.

Figure 1:
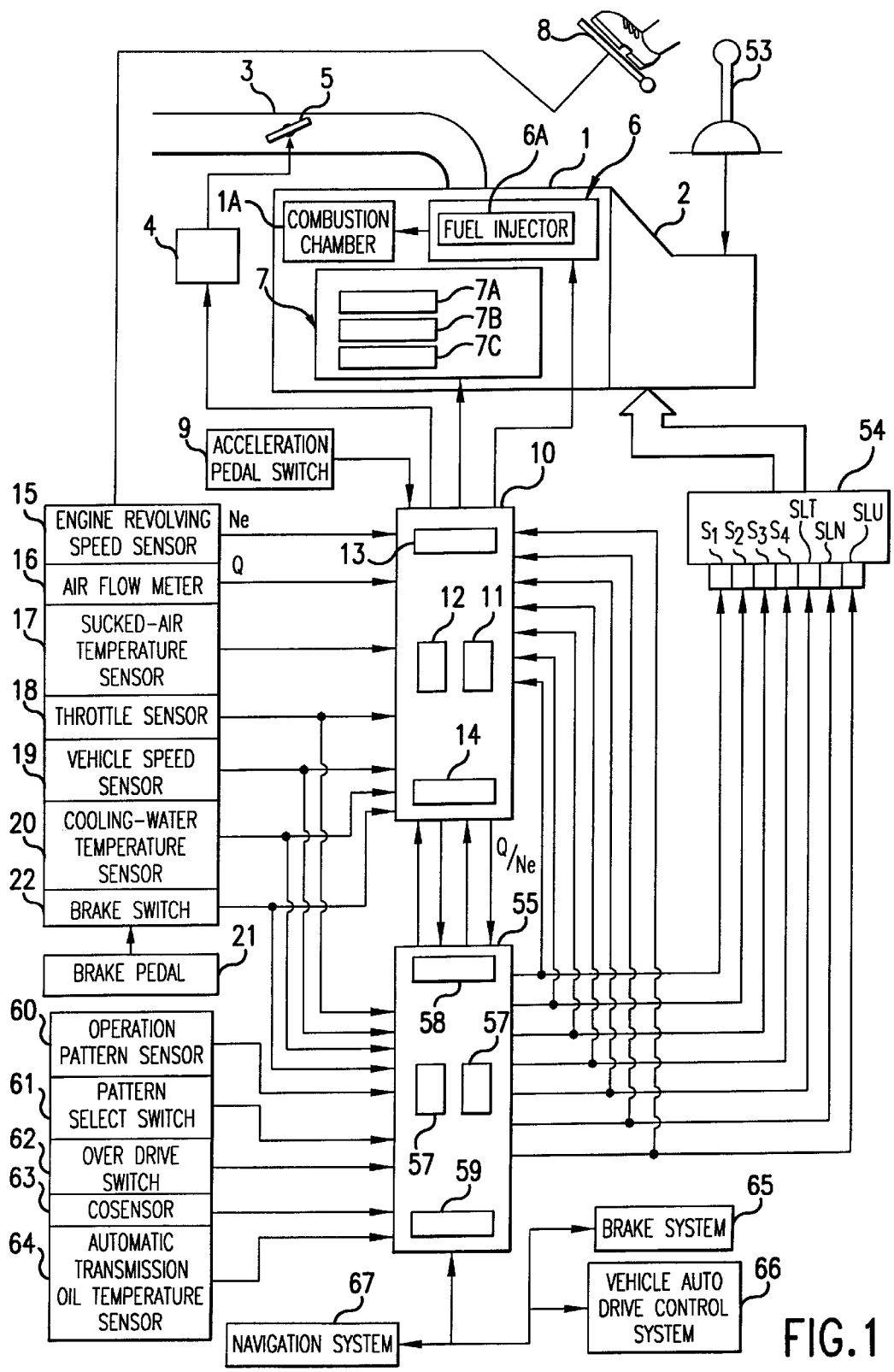
FIG. 1 is a block diagram showing a vehicular control system to which is applied the present invention.

The present invention will be described more specifically with reference to the accompanying drawings. First of all, here will be described the summary of a vehicle to which is directed the present embodiment. In FIG. 1, there is connected to the output side of an engine 1 acting as a power source, an automatic transmission 2, which is exemplified by transmission gear stages. The output power of the engine 1 is electrically controlled, and an intake manifold 3 of the engine 1 is provided with an electronic throttle valve 5, which is driven by a servo motor 4. The engine 1 is provided with a fuel injection control unit 6, including a fuel injector 6A, which controls the amount of the fuel injection in the combustion chamber 1A, and an ignition timing adjusting unit 7, including a spark plug 7A, a distributor 7B, and an ignition coil 7C. An opening amount of an acceleration pedal 8, which is used to control the output power of the engine 1, is detected by an acceleration pedal switch 9. The acceleration pedal switch 9 generates a signal indicative of the operating amount of the acceleration pedal 8, which is applied to the engine electronic control unit (E-ECU) 10. The engine electronic control unit 10 is comprised of a micro computer, which incorporates a central processing unit CPU) 11, a random-access memory (RAM) 12, an input interface circuit 13, and an output interface circuit 14. The engine electronic control unit 10 is fed with various kinds of data to control the engine 1, for example, data from an engine revolving speed sensor 15 for detecting the revolving speed of the engine (Ne), data from an air flow meter 16 for detecting the quantity of intake-air (Q), an intake-air temperature sensor 17 for detecting the temperature of intake air, and a throttle sensor 18 for detecting the opening degree Θ of the electronic throttle valve 5. Furthermore, the engine electronic control unit 10 is fed with data from a vehicle speed sensor 19 for detecting vehicle velocity in accordance with the revolving speed of the output shaft of the automatic transmission 2 or the like, cooling water temperature sensor 20 for detecting the temperature of cooling water for the engine 1, and a brake switch 22 for detecting the amount of the operation of brake pedal 21. The engine electronic control unit (E ECU) 10 calculates the data, which are from various sensors and switches, in order to determine the driving condition of the vehicle. At least one of the following is controlled based on the driving condition: opening of the electronic throttle valve 5, the amount of the fuel injection of the fuel injection control unit 6, or the ignition timing of the ignition control unit 7. The engine electronic control unit (E-ECU) 10 and navigation systems are connected to communicate with each other to exchange data. It is possible that the engine electronic control unit (E-ECU) 10 controls at least one of the opening of the electronic throttle valve 5, the amount of the fuel injection of the fuel injection control unit 6, or the ignition timing of the ignition control unit 7 based on the route data output from the navigation system, which indicates the route that the vehicle will follow. So the engine electronic control unit (E-ECU) 10 stores the standard data, which will be corrected by correspondence of the road information to the route, to control the opening of the electronic throttle valve 5, the amount of the fuel injection of the fuel injection control unit 6, or the ignition timing of the ignition control unit 7.

Figures 2, 3:
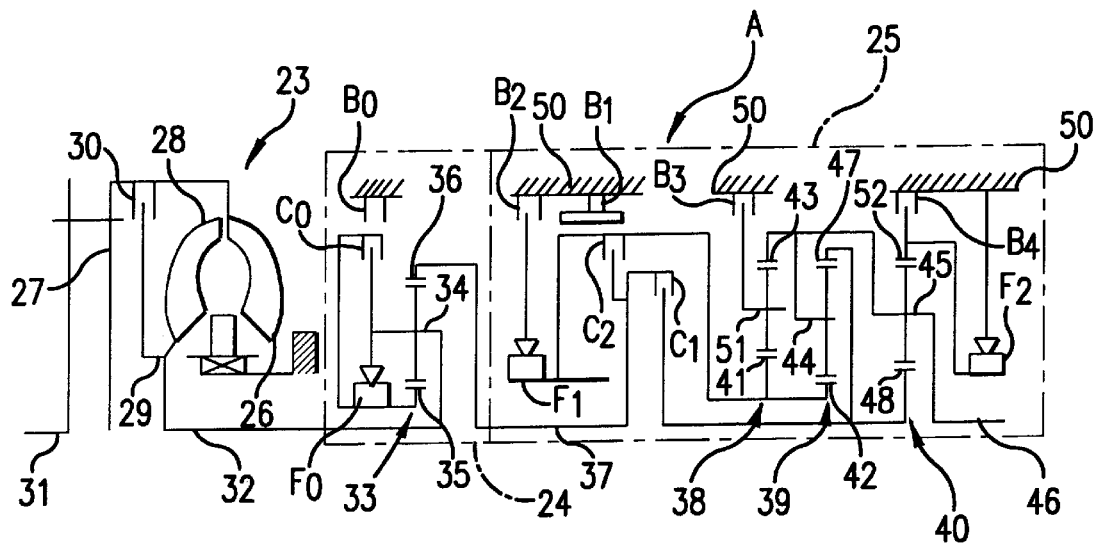
FIG. 2 is a skeleton diagram showing an example of a gear train of an automatic transmission according to the present invention.
FIG. 3 is a table showing engagement of friction engagement units for setting gear stages in the automatic transmission.

FIG. 2 shows one example of the automatic transmission 2 which is applied to this embodiment of the present invention. It is structured to be capable of setting five forward and one reverse gear stages; five forward gear stages that do not have non continuous gear ratio. The automatic transmission 2 has a torque converter 23, a sub-transmission section 24, and a main transmission section 25. The torque converter 23 has a front cover 27, which is attached to a pump impeller 26, a member which is attached to a turbine runner, in other words, hub 29, and a lock up clutch.

The front cover 27 is connected to a crank shaft 31 of the engine 1. An input shaft 32 of the automatic transmission 2 connected to the turbine runner 28 is connected to a carrier 34 of a planetary gear unit 33, which is the sub-transmission section 24 for the over drive gear stage. A multiple frictional clutch C0 and a one-way clutch FO are provided between the sun gear 35 and the carrier 34 which construct the planetary gear system 33. This one way clutch FO is arranged to be engaged when the sun gear 35 relatively rotates in the direction of positive rotation against the carrier 34, in other words, when it rotates in the same direction of the input shaft 32. A ring gear 36, which is the output element of the sub transmission section 24, is connected to the intermediate shaft 37, which is the input element of the main-transmission section 25. A brake BO is disposed to selectively stop the rotation of the sun gear 35. The sub-transmission section 24, when the clutch or the one way clutch FO is engaged, and the planetary gear unit rotate integrally, and the intermediate shaft 37 rotates the same speed as the input shaft 32. At this time the sub-transmission section 24 forms the low gear stage. When the brake BO engages to stop the rotation of the sun gear 35, the speed of the ring gear 36 is faster than the input shaft 32 and it positively rotates. At this time the sub-transmission section 24 forms the high gear stage. The main-transmission section 25 has three planetary gear units 38, 39, and 40. Rotational members of these planetary gear units is connected as follows. A sun gear 41 of the first planetary gear unit 38 and a sun gear 42 of the second planetary gear unit 39 are integrally connected to each other. A ring gear 43 of the first planetary gear unit 38, a carrier 44 of the second planetary gear unit 39, and a carrier 45 of the third planetary gear unit 40 are connected to each other. The carrier 45 is connected to an output shaft 46. A ring gear 47 of the second planetary gear unit is connected to a sun gear 48 of the third planetary gear unit.

This main-transmission 25 section is able to interchange a reverse gear stage and four forward gear stages. To establish gear stages, the clutches and brakes are disposed as follows. A first clutch C1 is disposed between the ring gear 47 connected to the sun gear 48 and the intermediate shaft 37. A second clutch C2 is disposed between the sun gear 41, and the first planetary gear unit 38, and is connected to the sun gear 42, the second planetary gear unit 39, and the intermediate shaft 37.

A band type first brake B1 is disposed for stopping rotations of the sun gear 41 of the first planetary gear unit 38 and the sun gear 42 of the second planetary gear unit 39. A first one way clutch F1 and a multiple friction plate type second brake B2 are in series disposed among the sun gear 41, the sun gear 42 and the housing 50. The first one way clutch F1 is arranged to be engaged when the sun gear 41 and the sun gear 42 are inversely rotated opposite to the direction of the rotation of the input shaft 32.

A third brake B3 is disposed between the carrier 51 of the first planetary unit 38 and housing 50. A fourth brake B4 and a second one way clutch F2 are in parallel disposed between the ring gear 52 and housing 50. The second one way clutch F2 is arranged to be engaged when the ring gear 52 is rotated inversely.

The foregoing automatic transmission 2 is able to set any one of the five forward and reverse gear stages. The states of engagements are release of each frictional engagement unit for setting the gear stages are shown in an engagement operation table depicted in FIG. 3. Referring to FIG. 3, mark ○ indicates an engaged state, mark ● indicates an engaged state when the vehicle is in the engine braking state, Δ indicates either an engaged state or released state is good, and no mark indicates a released state.

In this embodiment, the vehicle has a shift lever operable by the driver. The driver can select the operation position, namely, Park "P," Reverse "R," Neutral "N," Drive "D," Third "3" covering the gear stages of the third speed, Second "2" covering the gear stages of the second speed, and Low "L" covering the gear stage of the first speed.

A hydraulic control device 54 is used to achieve the gear stage or shift change of the automatic transmission 2, to engage or release a lock up clutch 30, line pressure of the oil, and oil pressure for the engaging the frictional engagement unit. The hydraulic control device is controlled by the transmission control unit 55. It has three solenoids, S1, S2, and S3 for shifting the gear stage of the automatic transmission 2 and one solenoid, S4, for establishing an engine braking effect. It has three linear solenoids, a first one is SLT for producing a line oil pressure of an oil circuit, a second one is SLN for controlling an accumulator back pressure of aa—during the shift changing of the automatic transmission 2, and a third one is SLU for controlling the oil pressure of the lockup clutch and specific frictional engagement units.

Control signals are sent from the transmission electronic control unit (T-ECU) 55 to the hydraulic control device 54. The gear stage of the automatic transmission 2, producing the line oil pressure of an oil circuit, and controlling the accumulator back pressure, is controlled on the basis of the signals. The shifting control unit is mainly of a microcomputer, which incorporates a central processing unit (CPU) 56, memories (RAM, ROM) 57, an input-interface circuit 58, and an out-put interface circuit 59. The transmission electronic control unit 55 receives data for controlling the automatic transmission 2, for example, from the throttle sensor 18, from the vehicle speed sensor 19, from the engine cooling water temperature sensor 20, from the brake switch 22, from the operation position sensor 60 for detecting the operated position of the shift lever which is manually operated, from a shift pattern select switch for selecting the shift patterns, which the automatic transmission 2 obey, from an overdrive switch 62, from an input shaft revolving sensor for detecting the revolving speed of the frictional engagement unit C0, and from an oil temperature sensor 64 for detecting the oil temperature in the automatic transmission 2.

The transmission electronic control unit (T-ECT) 55 and the engine electronic control unit (E-ECU) 10 are connected to communicate with each other, the engine electronic control unit 10 sends signals, for example, the quantity of intake air per cycle (Q/Ne) and the transmission electronic control unit 55 sends signals, for example, the equivalent signal for controlling the solenoids and the signals that indicates the gear stage which the automatic transmission 2 selects.

The transmission electronic control unit 55 determines the driving condition of the vehicle on the basis of the signals from various sensors and switches. It compares the driving condition and a shift diagram (or a shift map) in which the individual gear regions of forward stages are set by adopting the vehicle speed and the throttle opening, as parameters. By using the result of this comparison, it controls the gear stage, the engagement or release of the lockup clutch, the line pressure of the oil circuit, and the degree of the oil pressure of the engagement for the frictional engagement units.

The transmission electronic control unit (E-ECT) 55 and a navigation system which will be explained lately, are connected to communicate with each other. The navigation system sends signals, for example, the data about the route. The transmission electronic control unit (E-ECT) 55 controls the automatic transmission 2 on the basis of the signals from the navigation system. The transmission electronic control unit 55 stores the standard data and the procedures of the calculations in order to control the automatic transmission 2 in accordance with the condition of the route.

The transmission electronic control unit 55 outputs indication signals for the automatic transmission 2 on the basis of the signals from the various sensors and switches. It determines if there is a failure in the various solenoids based on the signals from the various sensors and switches. Preparing for the failure, the transmission has a fail safe function to control the automatic transmission 2 safely without preventing operating of the vehicle.

Figure 4:
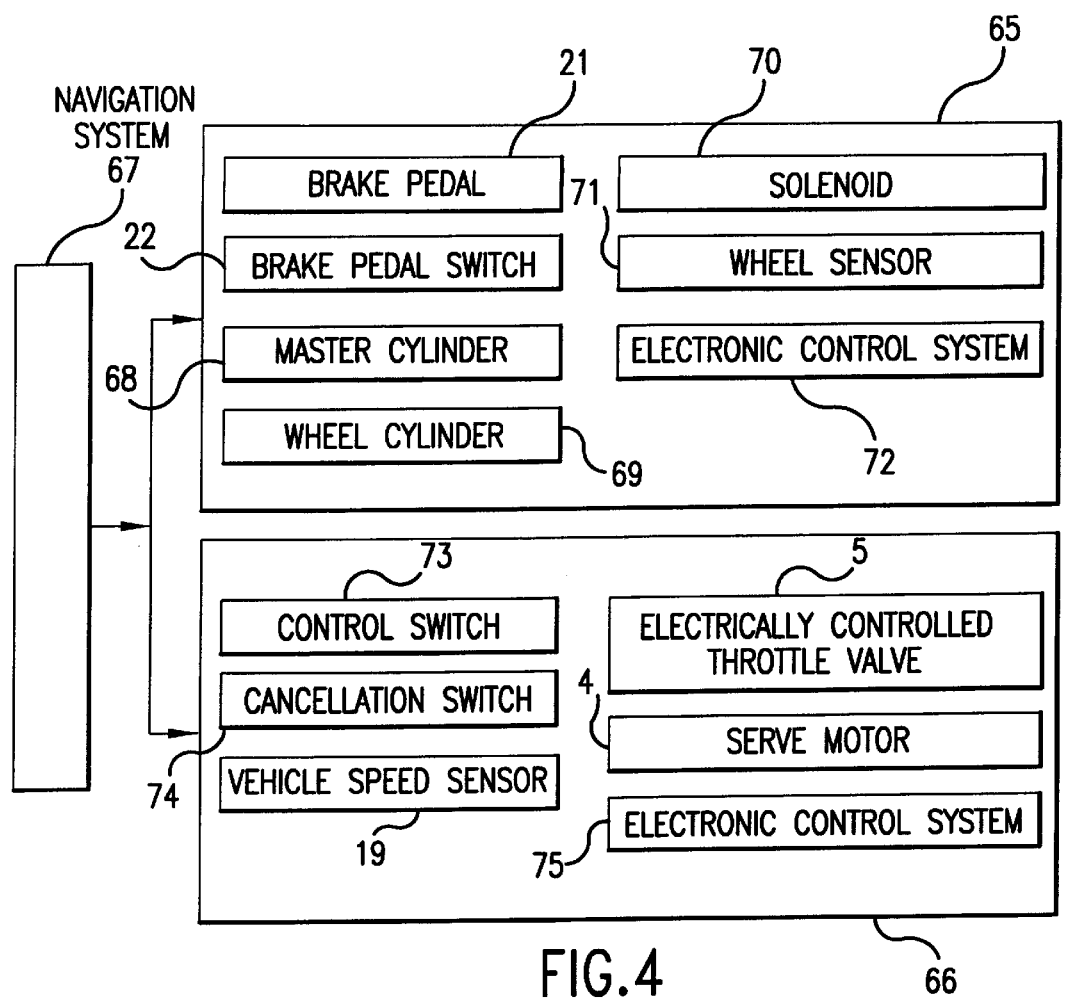
FIG. 4 is a block diagram showing the brake system and the automatic transmission control system to which is applied the present invention.

As shown in FIG. 1, the vehicle control system has a brake system 65, the vehicle auto drive control system 66, the suspension system 67. As shown in FIG. 4, the brake system 65 includes brake pedal 21 which is operated by the driver, a brake switch 22 for detecting the amount of the operation of brake pedal 21, and a master cylinder 68 which converts the operation power of the brake pedal 21 into the oil pressure. The brake system 65 has a wheel cylinder 69, to which is delivered the oil pressure electrically, wheel sensors 71 detect the revolving speed of each wheel individually, and the electronic control system 72 to which controls these elements on the basis of the operation of the brake pedal 21 and the driving condition of the vehicle. The brake system 65 has a wheel cylinder 69 to which is delivered the oil pressure from the master cylinder 68, solenoid valves which control the oil pressure electrically, wheel sensors 71 which detect the revolving speed of each wheel individually, and the electronic control system 72, which controls these elements on the basis of the operation of the brake pedal 21 and the driving condition of the vehicle. The brake system 65 creates a braking force when the oil pressure is applied to the wheel cylinder 69 by operating of the brake pedal 21, and has an anti lock brake function which prevents the wheels from locking by controlling the oil pressure of the wheel cylinder 69 on the basis of the signals detected by the wheel sensors 71. It is possible to have traction controlling the oil pressure of the wheel cylinder 69 of the brake system 65 and controlling the output torque of the engine 1 on the basis of the driving condition of the vehicle.

The brake system 65 and the navigation system 67 are connected to communicate with each other. It is possible to adapt the braking force by controlling the oil pressure to the wheel cylinder 69 on the basis of the information about the route detected by the navigation system 67. The electronic control system 72 stores the standard data and the procedures of the calculations in order to control the automatic transmission 2 in accordance with the condition of the route.

The vehicle auto drive control system 66 controls the engine 1 and the automatic transmission 2 in order to control the vehicle speed automatically. The vehicle auto drive control system 66 has a control switch 73 for setting the vehicle speed, a cancellation switch 74 for canceling the vehicle auto drive control, a vehicle speed sensor 19 for detecting the vehicle speed, an electrically controlled throttle valve 5 provided in the intake manifold 3 of the engine 1, an electronic throttle valve 5 which is driven by an servo motor 4, and an electrical control system 75 for controlling these elements on the basis of the selected vehicle speed and the driving condition of the vehicle. An operation signal from the control switch 73 of the vehicle auto drive control system 66 is sent to the engine electronic control unit (E-ECT) 10 and the transmission electronic control unit (T-ECT) 55. These units control the amount of the opening of the electronic throttle valve 5 at the specific condition and the gear stage without the operation of the acceleration pedal 8. Consequently the speed of the vehicle is fixed. The vehicle auto drive control system 66 cancels the automatic speed control by detecting at least one of the operations, acceleration pedal 8 movement, brake pedal 21 movement, or shift lever 53 movement of the automatic transmission 2. The vehicle auto drive control system 66 and the navigation system 67, which will be explained later, are connected to communicate with each other. The navigation system 67 sends signals, for example, the data about the route. It is possible to start or cancel the automatic speed control on the basis of the information on the route from the navigation system 67. The electronic control system 75 stores the standard data and the procedures of the calculations in order to control the vehicle auto drive control system 66 in accordance with the condition of the route.

Figure 5:
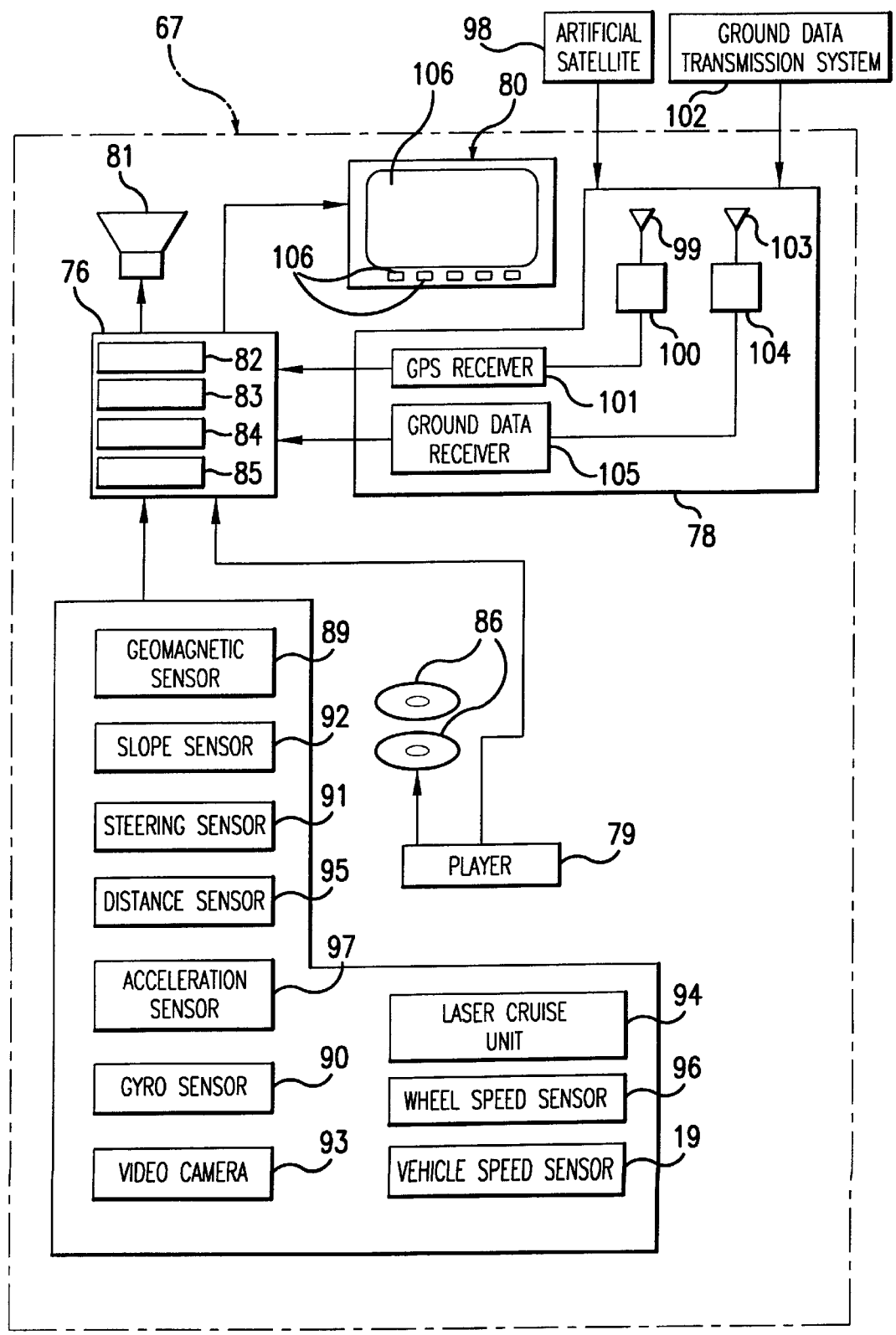
FIG. 5 is a block diagram showing a navigation system to which is applied the automatic transmission system of the present invention.

The following navigation system 67 is provided for improving the stability, drivability and power performance of the vehicle by feeding data and the instruction signals to the aforementioned transmission electronic control unit 55, the engine electronic control unit 10, the brake system 65, and the vehicle auto drive control system 66. The navigation system 67 guides its vehicle to a predetermined target. This navigation system 67 is equipped, as shown in FIG. 5, with an electronic control unit 76, a first data detecting unit 22, a second data detecting unit 23, a player 79, a multiple audio visual system 80, and a speaker 81.

The electronic control unit 76 is a microcomputer which include a central processing unit (CPU), a memory unit (RAM and ROM 83, input interface 84, and output interface 85. The player 79 is used for reading out data which is stored in a data recording medium 86, for example, an optical disk or a magnetic disk. The data recording medium 86 stores not only the data necessary for driving the vehicle, for example, place names, roads or main buildings along the roads but also specific road situations, for example, straight roads, curves, up slopes, down slopes gravel roads, sandy beaches, riverbeds, urban areas, mountain regions, ordinary roads, expressways, rivers, seas, paved or unpaved roads, rough or smooth roads, road signs, and traffic regulations.

Figure 6:
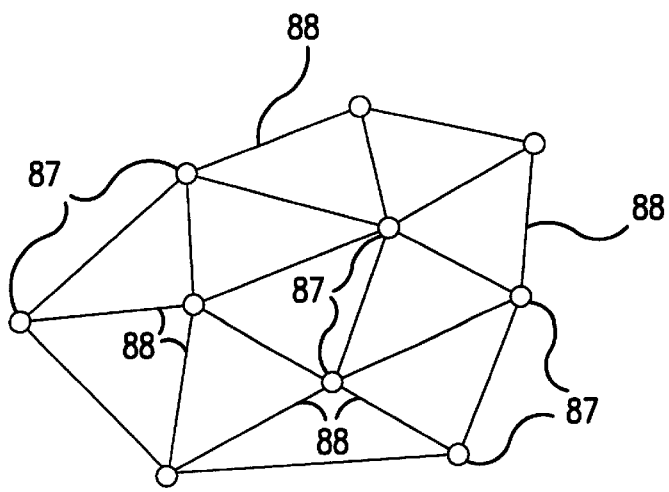
FIG. 6 is a conceptual diagram of an example of map data which is stored in the information memory of the navigation system in FIG. 5.

FIG. 6. Shows one of the examples; the road data are digitized and stored in the data recording medium 86. Specifically, the road map is divided in a mesh shape, and each mesh is composed as a unit of nodes 87, and links 88 joining the nodes 87. The stored contents are attributes of the links 88 joining the nodes 87, for example, the latitudes and longitudes of roads, road numbers, road width, distance of straight roads, road slopes and radii of curves.

The aforementioned first data detecting unit 22 is used to detect the present position of its vehicle, the road situations and the distance from other vehicles by the self-contained navigation, and is composed of a geomagnetic sensor 89 for detecting the azimuth for driving the vehicle, a gyrocompass 90, and a steering sensor 91 for detecting the steering angle of the steering wheel.

The first data detecting unit 22 is equipped with a slope sensor for detecting the slopes of roads, a video camera 93 for recognizing a front vehicle and detecting the distance therefrom, a laser cruise unit 94, a distance sensor 95, a wheel speed sensor 96 for detecting the rotational speeds of the individual wheels separately, an acceleration sensor 97 for detecting the acceleration of the vehicle in all directions and a vehicle speed sensor 19 for detecting the revolving speed of the output shaft of the transmission. Here, the laser cruise unit 94 controls the throttle opening to keep a set vehicle speed when the front vehicle is not detected by the laser radar or when the distance from the front vehicle is sufficiently large.

The first data detecting unit 22 and the electronic control unit 76 are connected to transmit the data so that the data, as detected by the first data detecting unit 22, is transferred to the electronic control unit 76. The second data detecting unit 23 detects the present position of its vehicle, the road situations, other vehicles, blocks and the weather, and is composed of a GPS antenna 99 for receiving radio waves from a man-made satellite 98, an amplifier 100 connected with the GPS antenna 99, and a GPS receiver 101 connected with the amplifier 100. The second data detecting unit 23 is equipped with an antenna 103 for receiving radio waves from a ground data transmission system 102 such as a transmitter carried on another vehicle, a beacon or sign post disposed on the road side, a VICS (Vehicle Information & Communication System) or an SSVS (Super Smart Vehicle System), an amplifier 104 connected with the antenna 103, and a ground data receiver 105 connected with the amplifier 45.

The GPS receiver 101 and the ground data receiver 105 are so connected with the electronic control unit 76 as to effect the data communications. The data, as detected by the second data detecting unit, are transferred to the electronic control unit 76.

The multiple audio visual system 80 has a display 106 which consists of a liquid crystal display or a cathode-ray tube (CRT) and various switches. The multiple audio visual system 80 displays the data graphically, for example, the road to follow to the destination, the road situations of the roads, the present position of the vehicle, the presence and location of other vehicles, or the presence and location of blocks, and displays the operating modes corresponding to the predetermined sections of the road situations and the shift diagrams to be used for controlling the automatic transmission 2 on the basis of the data stored in the data recording medium 86 or first and second data detecting unit 77 and 78. Incidentally, the various data are displayed in the display 106 and outputted as voices from the speaker 81.

With the multiple audio visual system 80, there are connected a various switches 107, which can be operated to control the first detecting unit 77 or the second data detecting unit 23, to set the destination and the road to follow, to set or change the predetermined sections in the roads, to enlarge or reduce the size of the map, and to display and change the shift map to be applied for controlling the automatic transmission 2.

In the navigation system 67, the data of the road which the vehicle will follow, as detected by the first data detecting unit 22, as detected by the second data detecting unit 23, and the map data, as stored in the data recording medium 86 are synthetically compared or evaluated to determine the road situations of or round the present position of the vehicle on the route being followed. The result of the comparison, the road situation, is indicated in the display 106 or the speaker 81.

Detection errors may be caused in the individual sensors when the present position is to be determined on the basis of the data to be detected by the first data detecting unit 22. Therefore, controls are preformed to absorb the errors by the map matching method. This map matching method is a control to correct the present position of the vehicle by comparing the operating locus of the vehicle, as detected from the signals of the various sensors, and the map data as stored in the data recording medium 86.

The followings are examples; the automatic transmission 2 which has plural and non-continuous gear stages are controlled on the basis of data about the condition of the route detected by the navigation system 67.

Figure 7:
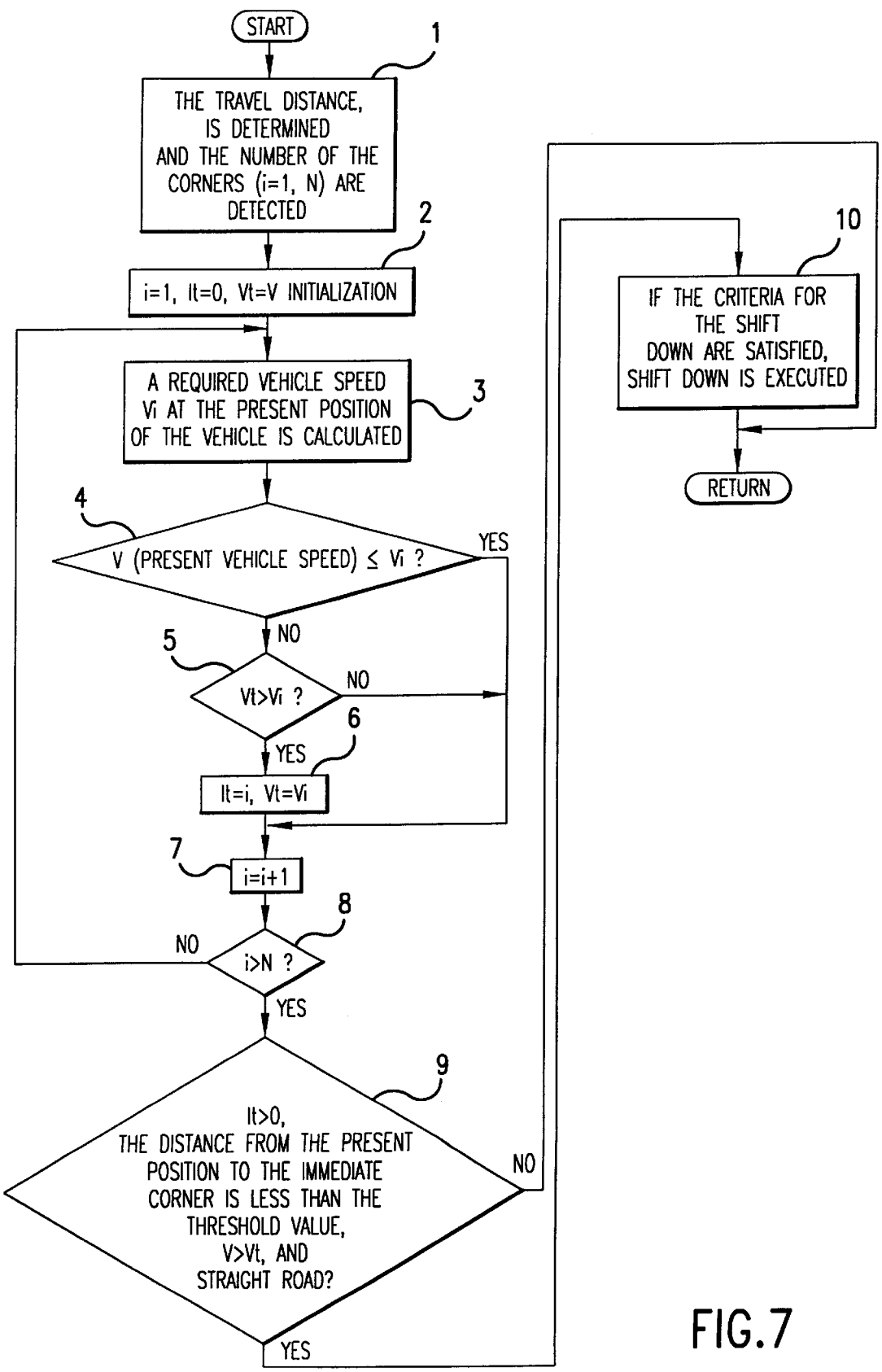
FIG. 7 is a flow chart showing an example of the control to be executed by the control system of the present invention.

FIG. 7 shows an example of the control flow.

In FIG. 7, the navigation system 67 or the transmission control unit 55 detects not only an immediate vehicle speed decreasing point, at which it is necessary to decrease the speed of the vehicle, but also the vehicle speed decreasing point within the predetermined distance place. And it determines whether the decrease in the speed needs to be more than the threshold or not at each place. And this determination is used for the control of the automatic transmission 2. First of all, the driver's operation for the setting of the destination and the indication of the map of the route is executed by using the switches 107 of the multiple audio visual system 80. The present position of the vehicle and the road ahead of the present position can be specified by the data of the first data detecting unit 22 and the second data detecting unit 23.

At Step 1, the traveling distance is determined if the vehicle decreases its speed from the present speed to zero the vehicle using the target deceleration, and the number of the corners i (i=1, N), which are regarded as vehicle speed decreasing points, at which it is necessary to decrease in speed, are detected in the determined traveling distance. The control of the Step 1 will be explained specifically in the example described in FIG. 8 and FIG. 9.

At Step 2, at first, the number of the corners i, a target corner It, and a vehicle target speed Vt are initialized, so these are set as i=1, It=0, and Vt=the present speed of the vehicle. The target corner It indicates a corner where a shift down is needed if the vehicle decreases in speed from the present. In other words, if the vehicle is to go through the corner smoothly, it must decrease its speed by more than the target deceleration. The vehicle target speed Vt is set for maintaining proper handling of the vehicle, stability of the operation, and good drivability if the vehicle rounds the corner.

The vehicle target speed Vt is calculated for each corner (i=N). The number of the corners (i=N) is detected at Step 1. The vehicle target speed Vt is the appropriate speed for maintaining handling of the vehicle, stability of the operation, and good drivability as the vehicle rounds each corner, and it is calculated based on the radius of the corner and so on. At Step 3, a required vehicle speed Vi at the present position of the vehicle is calculated in order to make the present vehicle speed V decrease to the vehicle target speed Vt for the specific corner. Vi is calculated on the basis of the distance between the present position of the vehicle and each corner. In other words, Vt is determined to pass through the i-th corner safely, and Vi is determined as how much speed the vehicle has to decrease at present. Vi is calculated on the basis of the distance between the present position and the i-th corner. Step 3 will be described in detail FIG. 10. At Step 4, it is decided whether the present vehicle speed is more than the required vehicle speed Vi or not. In other words, Step 4 judges whether it is possible for the vehicle to decrease the present speed to less than the vehicle target speed Vt when it enters the i-th corner, and if the vehicle decreases its speed by less than the vehicle target deceleration.

If the answer of Step 4 is NO, the control flow goes to Step 5. At Step 5, it is decided whether the required vehicle speed Vi corresponding to N corners is lower than the vehicle target speed. If the answer of the Step 4 is YES, the control flow goes to Step 6. At Step 6, the i-th corner is counted as a target corner It, and the vehicle target speed Vt is renewed to the minimum value of the required vehicle speed Vi.

At Step 7, the number of the corner i is increased by 1, which means one of the calculations of the vehicle target speed Vt corresponding to one of the corners is finished. At Step 8, it is decided whether the number of the corner i exceeds the number of the corner N, which is detected in Step 1. If the answer of Step 8 is NO, the control flow goes back to Step 3. The loop is constructed by Step 2, 3, and 8, and the loop counter i is the number of corners, which is detected by Step 1.

If the answer of Step 4 is YES, the control flow goes to Step 7, because there is a possibility to enter the corner at less than the vehicle target speed Vt even if the vehicle keeps the present vehicle speed V, if the answer of Step 5 is NO, the control flow goes to Step 7.

As shown in FIG. 7, if the answers of Step 4 is NO and Step 5 is YES, the i-th corner is counted as the target corner It. In other words, if the target deceleration from the present speed V to the required vehicle speed Vi of the specific corner is larger than the threshold value, the specific corner is regarded as the target corner It, and it is counted as the target corner It.

If the answer of the Step 8 is YES, it means that the all of the calculations about the vehicle target speed Vt, corresponding to the all the corners N, which are detected in Step 1, are finished. At Step 9, it is decided whether the target corner It is more than 0. If It is more than 0, it means that there is more than one corner where vehicle is not able to decrease its speed to the vehicle target speed Vt at the rate less than the target deceleration. And it is decided whether the distance from the present position to the immediate corner is less than the threshold value. And it is decided whether the present vehicle speed V is more than the vehicle target speed Vt, in other words, the present vehicle speed V is more than the minimum value of the required vehicle speed Vi. And it is decided whether the vehicle is on the straight road.

At Step 9, if the all criteria are satisfied, the control flow goes to Step 10. In other words, if there exists more than one target corner It and the corner is located on a straight road within the threshold distance from the present position, the control flow goes to Step 10. Because there exists It, there is little possibility to accelerate before entering the target corner, and the reduction of the vehicle speed, the shift down has little influence on the vehicle, stability of the vehicle, and the drivability.

At Step 10, if the criteria for the shift down of the automatic transmission 2 are satisfied, more than one gear stage of the shift down will be executed and the control flow returns. The criteria for the shift down include following condition, when the amount of the operation of the brake pedal 21 is detected, or when the amount of the operation of the acceleration pedal 8 is detected. The number of the shift at the same time is determined on the basis of the deceleration which is needed.

At Step 9, if the criteria are not satisfied, the shift down is not executed and the control flow returns. Because of the reduction of the vehicle speed or the shift down influences the behavior of the vehicle, stability of the vehicle, and the drivability.

According to the control flow shown in FIG. 7, when the corner is detected on the road ahead of the present position by the navigation system, the gear stage is only shifted down if the deceleration from the present vehicle speed to the required vehicle speed Vi is more than the threshold value. The shift down of the gear stage is used to get the engine to brake easily. So it is possible that when the criteria are satisfied, the control will be executed to get the engine brake effect.

In other words, if the deceleration is smaller than the threshold value, the shift down is prohibited. It is possible to decrease the number of the shift down of the automatic transmission 2 as small as possible. Comfort and drivability of the vehicle will be improved because the shift down of the automatic transmission 2 is controlled. As shown in FIG. 7, because the shift down of the automatic transmission 2 is controlled by taking account into the corners, the shift down is prohibited during the corner, and the shift shock during the corner is controlled, and the handling of the vehicle is stable and stability of the operation is improved.

Figure 8:
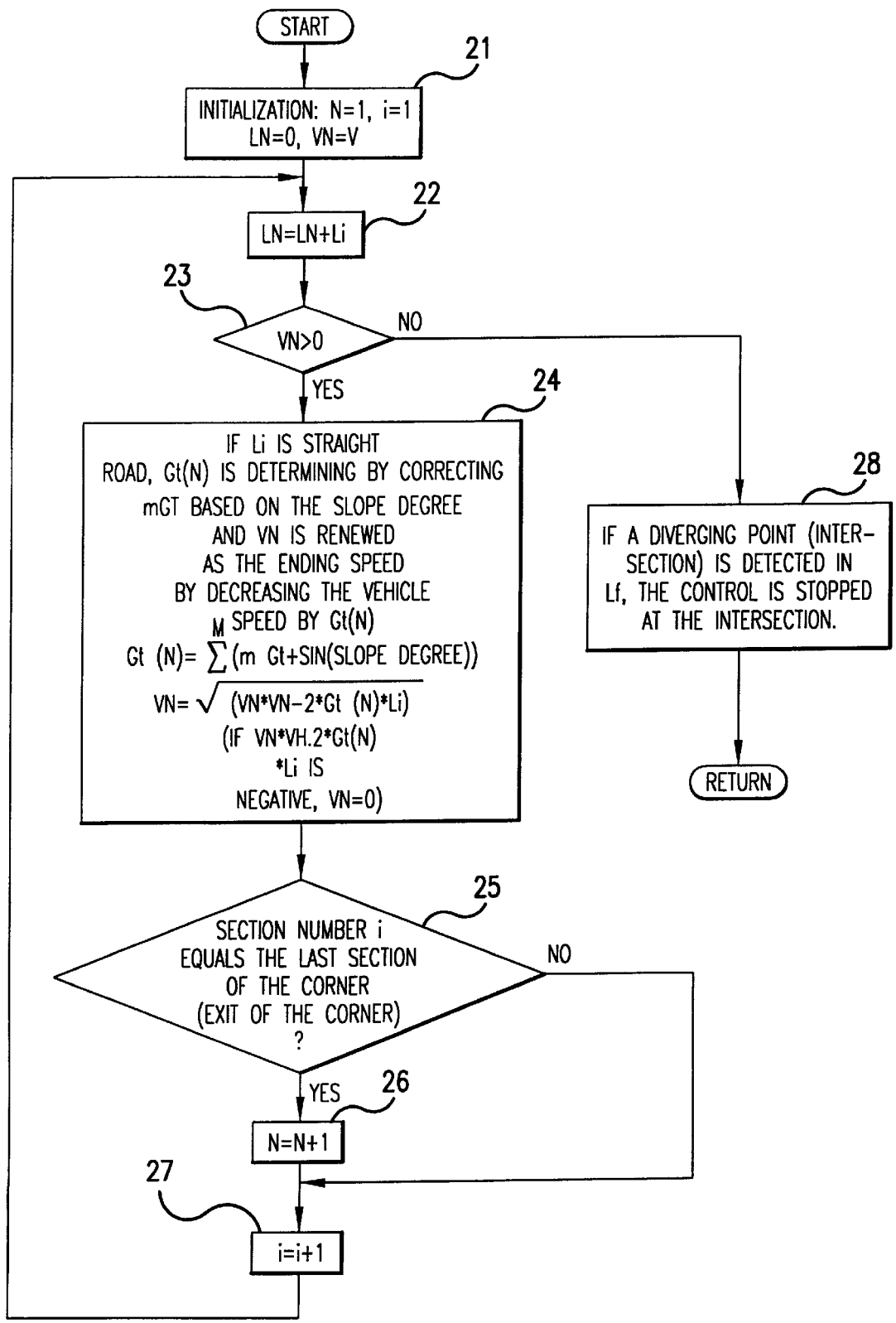
FIG. 8 is a flow chart showing a concrete example of the control to be executed at Step 1 of FIG. 7.

A control flow shown in FIG. 8, which is one of the examples, describes the embodiment in the Step 1 of the flow in FIG. 7. FIG. 8 shows the control flow which detects the corners on the road ahead of the present position during the present vehicle speed decrease to zero by the target deceleration, which corresponds to the present speed.

At Step 21, initializations are executed as N=1, i=1, LN=0, VN=V. N indicates the number of the corners, i indicates the section number which corresponds to links 88 of the map data which are stored in the data recording medium 86. LN indicates the distance between the present position at the N-th corner. VN indicates the vehicle speed at the N-th corner if the present vehicle speed decreases by the target deceleration. At Step 22, the distance, between the present position of the vehicle and the N-th corner, is calculated by adding the distance Li of the section i to the initialized distance LN=0. At Step 23, it is decided whether the vehicle speed VN is more than 0 or not. The above decision is for executing the following control when the vehicle goes through the corners until it stops.

If the answer of step 23 is YES, the control flow goes to Step 24. The target deceleration Gt (N) for each corner and the vehicle speed are calculated by using formula 1 and formula 2.

$$M\ Gt(N) = \Sigma(mGt + \sin(\text{slope degree}))/M \quad \text{(formula 1)}$$

$$VN = \sqrt{(VN*VN - 2*Gt(N)*Li)} \quad \text{(formula 2)}$$

The target speed decreasing rate Gt (N) is calculated by using formula 1, mGt is a one of the data from the map which stores the mGt corresponding to the vehicle speed VN, mGt is corrected by the road slope which is stored in the recording medium 86. M is the number of the data points of the slope degree. VN is renewed by using formula 2. If the vehicle runs at VN at the beginning and it runs Li distance, VN is renewed as the ending speed by decreasing the vehicle speed at the target deceleration. If the result of the (VN*VN−2*Gt(N)*Li) is less than 0, VN=0 is set. On a straight road to the next corner, it is possible to determine the slope data by using the actual information of the vehicle, not using the data from the data recording medium. In detail, it is calculated by comparing a standard acceleration value which is stored in the engine electronic control unit (E-ECU) 10 and the actual acceleration value which is calculated from information from the vehicle speed sensor 19.

At Step 25, it is decided whether the section number i be a last section which includes the corner. In other words, it is decided whether the vehicle reaches the exit the corner. If the answer of Step 25 is YES, the control flow goes to Step 26, and 1 is added to the initialized N which is the number of the corner.

At Step 27, 1 is added to the initialized i which is the number of the section number i, and the control flow returns to the Step 22. IF the answer of the Step 25 is NO, the control flow goes to Step 27. This prevents from counting the same corner repeatedly.

If the answer of Step 23 is NO, the control flow goes to Step 28. Detection for all of the corners, which exist between the present position and where the vehicle stops, are finished. At Step 28, if a diverging point, such as an intersection, is detected between the present point and the distance of Lf by the navigations system 67, it is impossible to predict which way the driver will choose. So control of the detecting the corners stopped and the control flow returns. The loop is constructed by Steps 21, 23, and 27, and the loop counter is i.

Figure 9:
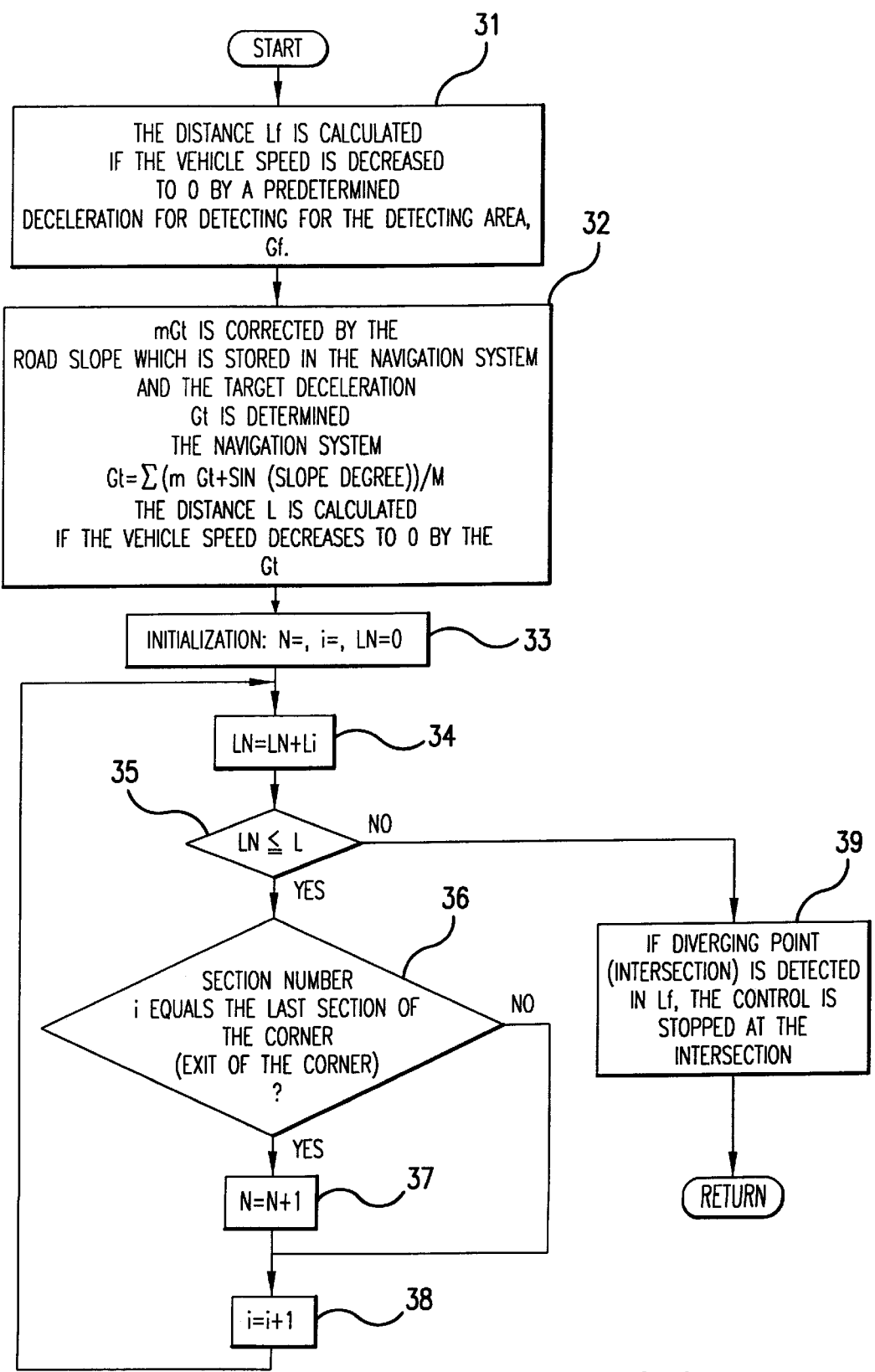
FIG. 9 is a flow chart showing a concrete example of the control to be executed at Step 1 of FIG. 7.

The control flow shown in FIG. 9, which is another example, describes the embodiment Step 1 of the flow in FIG. 7. FIG. 9 shows the control flow which detects the corners on the road ahead of the present position during the present vehicle speed decrease to zero by a predetermined deceleration from the present vehicle speed.

At Step 31, the distance Lf is calculated if the present vehicle speed is decreased to 0 by a predetermined deceleration for detecting area.

$$Lf=V*V/(2*Gf)$$

At this formula, V indicates the present vehicle speed, Gf indicates the predetermined deceleration for the detecting area. Gf is determined so the vehicle is able to smoothly stop if the vehicle decreases from the present vehicle speed. Gf is determined as a provisional value, and it is set as 0<Gf<Gt. Gt indicates the minimum value of the target deceleration for the present vehicle speed.

As a standard value is determined by the map which stores the target deceleration corresponding to the present vehicle speed mGt, mGt is corrected by the road slope which is stored in the recording medium 99 and the target deceleration Gt is determined. This calculation is executed by a formula 3.

$$M\ Gt=7(mGt+\sin(\text{slope degree})/M \qquad \text{(formula 3)}$$

In the formula 3, Gt indicates the target deceleration, mGt indicates the target deceleration corresponding to the present vehicle speed determined by the map. M is a number of the data point of the slope degree. At Step 23, the distance L is calculated if the present vehicle speed is decreased to 0 by the target deceleration Gt for detecting area.

$$L=V*V/(2*Gt)$$

The distance L is the standard for the detecting the corners ahead of the present position.

At Step 33, initializations are executed as N=1, i=1, LN=0. N indicates the number of the corners, i indicates the section number which corresponds to links 88 of the map data which are stored the data recording medium 99. LN indicates the distance between the present position and the N-th corner.

At Step 35, it is decided whether the distance between the present position and the N-th corner is smaller than the standard distance for detecting corners L. At Step 35, the answer is YES, the control flow goes to Step 36 and it is decided whether the section number i is a last section which consists of the corner. In other words, it is decided whether the detected section shows the exit of the corner.

If the answer of the Step 36 is YES, the control flow goes to Step 37, 1 is added to the number of the N which is initialized, 1 is added to the initialized i which is the number of the section number i, and the control flow returns to the Step 34. If the answer of the Step 36 is NO, the control flow goes to Step 38. Step 36 and Step 37 are executed because they prevent from counting the same corner repeatedly.

If the Answer of Step 35 is No, the control flow goes to Step 39. Detection for all of the corners, which exist between the present position and the distance L, is finished. At Step 39, the same control as the Step 28 of FIG. 8 is executed and the control flow returns. The loop is constructed by Step 33, Step 35 and Step 38, and the loop counter is i.

Figure 10:
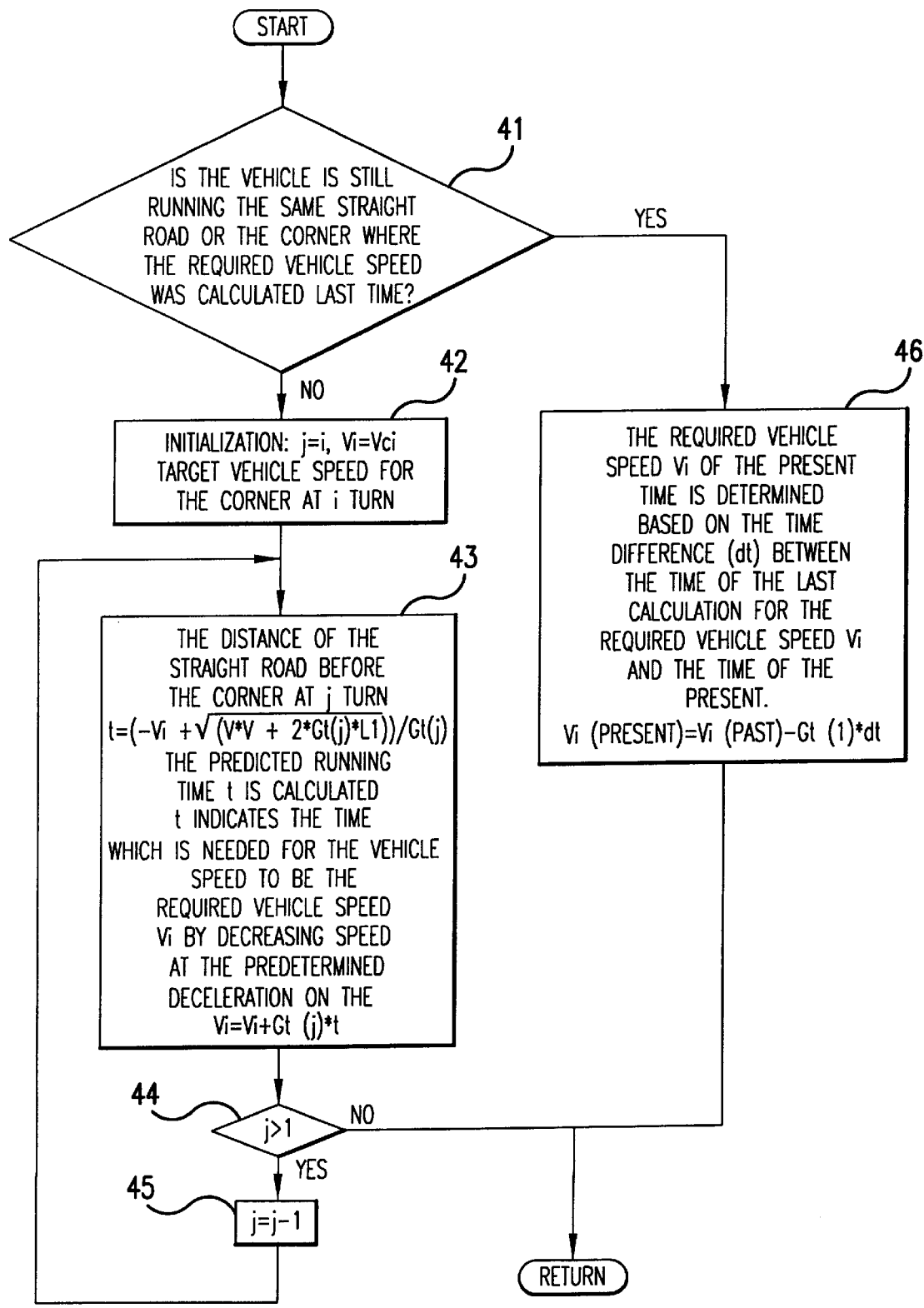
FIG. 10 is a flow chart showing a concrete example of the control to be executed at Step 3 of FIG. 7.

A control flow shown in FIG. 10, which is an example, describes about the concrete contents of Step 3 of the flow in FIG. 7. FIG. 10 shows the detail procedure for calculating the required vehicle speed Vi. At Step 41, it is decided whether the vehicle is still running the same straight road or the corner where the required vehicle speed was calculated last time. And it is decided whether there is no change in the slope degree or the radius of the corner.

If the answer of Step 41 is NO, the control flow goes to Step 42, because it is needed to calculate the required vehicle speed Vi again, initialization is executed as j=i, and Vi=Vci at Step 42. Vci indicates the vehicle target speed at the corner at i turn, and j is a number from the corner at i turn.

The navigation system 67 detects the distance of the straight road before the corner of j turn. And a predicted running time t is calculated during running on the straight road. The predicted running time t indicates the time which is needed for the vehicle speed to be the required vehicle speed vi by decreasing the speed at the predetermined deceleration on a straight road. The predictive running time is calculated by using formula 4.

$$t=-Vi+(\sqrt{(V*V+2*Gt(j)*L1))}/Gt(j) \qquad \text{(formula 4)}$$

At formula 4, Gt(j) indicates the deceleration. Li indicates the distance of the straight road. At Step 43, the required vehicle speed Vi which is for the straight road before the corner in j turn is calculated by using the following formula.

$$Vi=Vi+Gt(j)*t$$

Vi in the right side of the formula indicates the present vehicle speed. If the vehicle speed is reduced after the vehicle enters the corner, there is possibility that the behavior of the vehicle will be inappropriate and the stability of the vehicle will decline. So the control of Step 43 is executed, in detail, when the vehicle runs on the straight road, before entering the corner j, and the vehicle speed is reduced and when the vehicle enters the corner, the speed of the vehicle is kept almost the same during the rounding the corner.

At Step 44, it is decided whether the corner number j is larger than 1, in other words, it is decided whether the vehicle have reached the target corner in i turn. If the answer of Step 44 is YES, 1 is subtracted from the corner number j, and the control flow returns to Step 43. The loop, for the calculating the required vehicle speed Vi, is constructed by Steps 42, 43, and 45, and the corner number j is a loop counter.

If the answer of Step 44 is No, the control flow returns. If the answer of Step 41 is YES, the control flow goes to Step 46. The required vehicle speed vi of the present time is determined by using the following formula. The required vehicle speed Vi of the last time is corrected based on the time difference dt between the time of the last calculation for the required vehicle speed Vi and the time of the present, as a result, the required vehicle speed of the present time is determined. After the correction, the control flow returns.

$$Vi(\text{present})=Vi(\text{last time})-Gt(1)*dt$$

Using the control of Step 46, it is possible that Step 2 and Step 5 of FIG. 7 need not be executed N times repeatedly. It can reduce the burden of the calculation of the system.

Instead of the control shown in FIG. 7, it is possible to adapt the following example. The control system has a vehicle speed decreasing point detector which detects only those places where it is necessary to decrease the vehicle speed. The vehicle target speed calculator calculates a vehicle target speed only for the vehicle speed decreasing point. And it has a target deceleration calculator which calculates the decrease speed to the vehicle target speed. And it has a gear stage controller which executes shift down of the automatic transmission 2 only if the decrease speed is more than the threshold.

It is possible for automatic transmission 2 to control other systems to decrease the vehicle speed. In such a case, the information about the corner detected by the navigation system 67, the distance between present position and the corner, and the radius of the corner are used for the control.

For example, if the vehicle speed decreasing point is detected by the navigation system 67, electronic throttle valve 5 is shut to increase the force of engine braking, the oil pressure for the wheel cylinder 69 of the brake system 65 is controlled to increase the force of the braking, and the control of the same speed control, by the vehicle auto drive control system 66, is canceled to decrease the speed.

The predetermined target side direction acceleration is corrected by the coefficient of friction of the road which is determined based on the revolving speed difference by wheel speed 71 and the braking force is controlled.

Furthermore, it is possible to calculate the lateral acceleration based on the vehicle speed during the corner and the radius of the corner, and the control of the deceleration will take into account the result of the calculation. It is a kind of learning control of the target lateral acceleration, for example, if the result of the calculation is larger than the predetermined lateral acceleration, the difference between the calculated value and the predetermined lateral acceleration will be added to the target lateral acceleration; if the result of the calculation is smaller than the predetermined lateral acceleration, the difference between the calculated value and predetermined lateral acceleration will be subtracted from the target lateral acceleration. If the data, which are renewed from the learning and are reflecting the tendency of the driver, are used for the control of the lateral acceleration, the control of the sown shift, and the other controls, will improve the drivability.

It is possible to execute learning control to correct the target deceleration by the tendency of the driver. For example, it is detected if the deceleration occurs during braking before the corner. If the detected deceleration is greater than the predetermined target deceleration, the difference value between the detected decreasing speed rate and the predetermined target value is added to the target deceleration. If the deceleration is smaller than the predetermined target deceleration, the difference value is reduced from the target deceleration.

Reflecting the target decreasing speed which is controlled by the learning control, the decreasing speed is conformed to the driver's liking, and consequently, the drivability is improved.

The following example is also possible. The road slope is detected based on the data from the vehicle speed sensor 19, throttle sensor 18, engine revolving speed sensor 15, and the slope sensor 92. The vehicle speed when the vehicle enters the corner is predicted on the basis of the detected data. And if the predicted speed is higher than a permissible speed, the automatic transmission 2 shifts down.

As a result, while the vehicle is running on the up slope, if it predicts that the vehicle speed will decrease enough before the next corner because of the slope, the down shift is prohibited. While the vehicle is running on the down slope, if it predicts that the vehicle speed will increase before the next corner because of the slope, the down shift is executed. These controls improve the drivability.

The following example is also possible. While the vehicle is running before the corner, if the ON signal of the brake switch 22 or OFF signal of the acceleration pedal switch 9 is detected, the automatic transmission 2 shifts down. In other words, while the vehicle is running before the corner, if the driver's intention is to decrease the speed, for example, operation of the brake pedal 21 or the release of the acceleration pedal 8, is detected, so the automatic transmission 2 shifts down. The down shift is executed when the driver's intention of decreasing the speed is detected, so it does not create a bad feeling of drivability.

Furthermore, the automatic transmission 2 is controlled on the basis of the road conditions detected by the navigation system 67, if a diverging point, such as an intersection, is detected on the road ahead of the present position, it is impossible to predict which way the driver will choose. So control of the detecting the corners is stopped or control of the automatic transmission 2 is prohibited. As a result, it is possible to prevent disagreement between the road condition and the driving force of the vehicle, and improve the drivability. This invention is applicable to the automatic transmission which is capable of setting three forward gear stages or four forward gear stages. And this invention is applicable to the vehicle which is equipped an electronic motor as a power source.

In this invention, it is possible not to down shift if the deceleration is smaller than the threshold value. And this invention reduces the number of the transmission condition changes, for example, down shift, as possible as it can. So it is able to control the shift shock of the automatic transmission and improve the comfort of the vehicle and drivability. The invention prohibits a down shift during the corner, so it is improves the shift shock and the behavior of the vehicle and stability of the vehicle.

In this invention, transmission is defined as automatic transmission and the route information detector is defined as the navigation system. The vehicle speed decreasing point includes anywhere that is detectable by the navigation system and it is necessary to decrease the vehicle speed, for example, a stop place which is determined by traffic regulation, a obstacle including fallen trees and fallen stones, slope down road, low frictional coefficient road, the end of congestion, and so on.

What is claimed is:

1. A control system for a transmission, which is controlled by a shift instruction based on a predetermined shift diagram and a route information detector which detects information on a route that a vehicle follows, comprising:

a vehicle speed decreasing point detector which detects a vehicle speed decreasing point on the route where it is necessary to decrease vehicle speed;

a vehicle target speed calculator which calculates a vehicle target speed for the vehicle speed decreasing point;

a target deceleration calculator which calculates a decrease speed to the vehicle target speed;

a vehicle deceleration calculator which calculates a deceleration to make a present vehicle speed be the target speed;

a deceleration judgment device which decides whether said deceleration is larger than a threshold value; and a transmission condition change device which changes a transmission condition to effect an engine braking condition when the deceleration judgment device decides that the deceleration is larger than the threshold value.

2. A control system for a transmission, which is controlled by a shift instruction based on a predetermined shift diagram and a route information detector which detects information on a route that a vehicle follows, comprising:

a vehicle speed decreasing point detector which detects a vehicle speed decreasing point on the route where it is necessary to decrease vehicle speed;

a vehicle target speed calculator which calculates a vehicle target speed for the vehicle speed decreasing point;

a target deceleration calculator which calculates a decrease speed to the vehicle target speed;

a vehicle deceleration calculator which calculates a deceleration to make a present vehicle speed be the target speed;

a deceleration judgment device which decides whether said deceleration is larger than a threshold value; and a transmission condition change device which changes a transmission condition to effect an engine braking condition when the deceleration judgment device decides that the deceleration is larger than the threshold value, wherein the vehicle speed decreasing point where it is necessary to decrease the vehicle speed includes a corner.

3. A control system for a transmission, which is controlled by a shift instruction based on a predetermined shift diagram and a route information detector which detects information on a route that a vehicle follows, comprising:

a vehicle speed decreasing point detector which detects a vehicle speed decreasing point on the route where it is necessary to decrease vehicle speed;

a vehicle target speed calculator which calculates a vehicle target speed for the vehicle speed decreasing point, a target deceleration calculator which calculates a decrease speed to the vehicle target speed;

a vehicle deceleration calculator which calculates a deceleration to make a present vehicle speed be the target speed;

a deceleration judgment device which decides whether said deceleration is larger than a threshold value;

a transmission condition change device which changes a transmission condition to effect an engine braking condition when the deceleration judgment device decides that the deceleration is larger than the threshold value, and further comprising a transmission condition change device which shifts down a gear stage.

4. A control system for a transmission, which is controlled by a shift instruction based on a predetermined shift diagram and a route information detector which detects information on a route that a vehicle follows, comprising:

a vehicle speed decreasing point detector which detects a vehicle speed decreasing point on the route where it is necessary to decrease vehicle speed;

a vehicle target speed calculator which calculates a vehicle target speed for the vehicle speed decreasing point;

a target deceleration calculator which calculates a decrease speed to the vehicle target speed;

a vehicle deceleration calculator which calculates a deceleration to make a present vehicle speed be the target speed;

a deceleration judgment device which decides whether said deceleration is larger than a threshold value; and a transmission condition change device which changes a transmission condition to effect an engine braking condition when the deceleration judgment device decides that the deceleration is larger than the threshold value, wherein the vehicle target speed is set to maintain good behavior of the vehicle, stability of the operation, and good drivability if the vehicle rounds a corner.

5. A control system for a transmission, which is controlled by a shift instruction based on a predetermined shift diagram and a route information detector which detects information on a route that a vehicle follows, comprising:

a vehicle seed decreasing point detector which detects a vehicle speed decreasing point on the route where it is necessary to decrease vehicle speed;

a vehicle target speed calculator which calculates a vehicle target speed for the vehicle speed decreasing point;

a target deceleration calculator which calculates a decrease speed to the vehicle target speed;

a vehicle deceleration calculator which calculates a deceleration to make a present vehicle speed be the target speed;

a deceleration judgment device which decides whether said deceleration is larger than a threshold value; and a transmission condition change device which changes a transmission condition to effect an engine braking condition when the deceleration judgment device decides that the deceleration is larger than the threshold value, wherein the threshold value is set so the driver may not feel the deceleration.

6. A control system for a transmission, which is controlled by a shift instruction based on a predetermined shift diagram and a route information detector which detects information on a route that a vehicle follows, comprising:

a vehicle speed decreasing point detector which detects a vehicle speed decreasing point on the route where it is necessary to decrease vehicle speed;

a vehicle target speed calculator which calculates a vehicle target speed for the vehicle speed decreasing point;

a target deceleration calculator which calculates a decrease speed to the vehicle target speed;

a vehicle deceleration calculator which calculates a deceleration to make a present vehicle speed be the target speed;

a deceleration judgment device which decides whether said deceleration is larger than a threshold value;

a transmission condition change device which changes a transmission condition to effect an engine braking condition when the deceleration judgment device decides that the deceleration is larger than the threshold value; and a distance detector which detects whether a distance from the present position to an immediate corner is less than a threshold value.

7. The control system for a transmission according to claim 6, wherein the driver's intention detector detects driver's intention by detecting a brake pedal operation or an acceleration pedal operation.

8. A control system for a transmission, which is controlled by a shift instruction based on a predetermined shift diagram and a route information detector which detects information on a route that a vehicle follows, comprising:

a vehicle speed decreasing point detector which detects a vehicle speed decreasing point on the route where it is necessary to decrease vehicle speed;

a vehicle target speed calculator which calculates a vehicle target speed for the vehicle speed decreasing point;

a target deceleration calculator which calculates a decrease speed to the vehicle target speed;

a vehicle deceleration calculator which calculates a deceleration to make a present vehicle speed be the target speed;

a deceleration judgment device which decides whether said deceleration is larger than a threshold value;

a transmission condition change device which changes a transmission condition to effect an engine braking condition when the deceleration judgment device decides that the deceleration is larger than the threshold value; and a driver's intention detector which detects whether the driver intends to decrease the vehicle speed based on an operating condition of the vehicle by the driver.

9. The control system for a transmission according to claim 8, wherein the driver's intention detector detects a predetermined amount of the operation of a brake pedal.

10. The control system for a transmission according to claim 8, wherein the driver's intention detector detects a predetermined amount of the operation of an accelerator pedal.

11. A control system for a transmission, which is controlled by a shift instruction based on a predetermined shift diagram and a route information detector which detects information on a route that a vehicle follows, comprising:
   a vehicle speed decreasing point detector which detects a vehicle speed decreasing point on the route where it is necessary to decrease vehicle speed;
   a vehicle target speed calculator which calculates a vehicle target speed for the vehicle speed decreasing point;
   a target deceleration calculator which calculates a decrease speed to the vehicle target speed;
   a vehicle deceleration calculator which calculates a deceleration to make a present vehicle speed be the target speed;
   a deceleration judgment device which decides whether said deceleration is larger than a threshold value;
   a transmission condition change device which changes a transmission condition to effect an engine braking condition when the deceleration judgment device decides that the deceleration is larger than the threshold value;
   a diverging point detector which detects whether a diverging point exists on the route; and
   a vehicle speed decreasing detection prohibit device which prohibits from detecting a vehicle speed decreasing point where it is necessary to decrease the vehicle speed.

12. A control system for a transmission, which is controlled by a shift instruction based on a predetermined shift diagram and a route information detector which detects information on a route that a vehicle follows, comprising:
   a vehicle speed decreasing point detector which detects a vehicle speed decreasing point on the route where it is necessary to decrease vehicle speed;
   a vehicle target speed calculator which calculates a vehicle target speed for the vehicle speed decreasing point;
   a target deceleration calculator which calculates a decrease speed to the vehicle target speed;
   a vehicle deceleration calculator which calculates a deceleration to make a present vehicle speed be the target speed;
   a deceleration judgment device which decides whether said deceleration is larger than a threshold value;
   a transmission condition change device which changes a transmission condition to effect an engine braking condition when the deceleration judgment device decides that the deceleration is larger than the threshold value; and
   a target deceleration correction device which corrects the deceleration based on a slope of the road.

13. A control system for a transmission, which is controlled by a shift instruction based on a predetermined shift diagram and a route information detector which detects information on a route that vehicle follows,
   comprising:
   a vehicle speed decreasing point detector which detects a point where it is necessary to decrease vehicle speed;
   a vehicle target speed calculator which calculates a vehicle target speed for the vehicle speed decreasing point;
   a target deceleration calculator which calculates a decrease speed to the vehicle target speed;
   a vehicle deceleration calculator which calculates a deceleration to make a present vehicle speed be the target speedl; fiber channels coupling said host computers to said storage device
   a deceleration judgment device which decides whether said deceleration is larger than a threshold value;
   a transmission condition change device which changes a transmission condition to effect an engine braking condition when the deceleration judgment device decides that the deceleration is larger than the threshold value; and
   a target deceleration correction device which corrects the deceleration based on the braking condition.

14. A method for controlling a transmission, which controls the transmission by a shift instruction based on a predetermined shift diagram and route information for a route that a vehicle follows, comprising the steps of:
   detecting a vehicle speed decreasing point on the route where it is necessary to decrease the vehicle speed;
   calculating a vehicle target speed for the vehicle speed decreasing point;
   calculating a decrease speed to the vehicle target speed;
   calculating a deceleration to make the present vehicle speed be the target speed;
   determining whether said deceleration is larger than a threshold value; and
   changing the transmission condition effects an engine braking condition when the deceleration is larger than the threshold value.

15. A method for controlling a transmission, which controls the transmission by a shift instruction based on a predetermined shift diagram and route information for a route that a vehicle follows, comprising the steps of:
   detecting a vehicle speed decreasing point on the route where it is necessary to decrease the vehicle speed;
   calculating a vehicle target speed for the vehicle speed decreasing point;
   calculating a decrease speed to the vehicle target speed;
   calculating a deceleration to make the present vehicle speed be the target speed;
   determining whether said deceleration is larger than a threshold value; and
   changing the transmission condition effects an engine braking condition when the deceleration is larger than the threshold value
   detecting a corner on the route as a vehicle speed decreasing point where it is necessary to decrease the vehicle speed.

16. A method for controlling a transmission, which controls the transmission by a shift instruction based on a predetermined shift diagram and route information for a route that a vehicle follows, comprising the steps of:

detecting vehicle speed decreasing point on the route where it is necessary to decrease the vehicle speed;

calculating a vehicle target speed for the vehicle speed decreasing point;

calculating a decrease speed to the vehicle target speed;

calculating a deceleration to make the present vehicle speed be the target speed;

determining whether said deceleration is larger than a threshold value;

changing the transmission condition effects an engine braking condition when the deceleration is larger than the threshold value; and shifting down the gear stage.

* * * * *

UNITED STATES PATENT AND TRADEMARK OFFICE
CERTIFICATE OF CORRECTION

PATENT NO. : 6,182,000
DATED : January 30, 2001
INVENTOR(S) : Takashi Ohta et al.

It is certified that error appears in the above-identified patent and that said Letters Patent is hereby corrected as shown below:

Title page,
ABSTRACT, please replace the ABSTRACT with the following:

-- A control system for an automatic transmission includes a route information detector which detects route information for the vehicle and a transmission which is controlled by the route information detector. The control system also detects the places where it is necessary to decrease speed in the determined traveling distance, calculates the vehicle target speed for each corner, and calculates the required vehicle speed at the present position of the vehicle to decrease present vehicle speed to the vehicle target speed for the place where it is necessary to decrease speed. If the target deceleration from the present speed to the required vehicle speed is larger than a threshold value, the place is regarded as the target place, and it is counted as the target place, and the automatic transmission is shifted down. --

Column 4,
Line 50, change "FO" to F0 --.
Line 52, change "FO" to F0 --.
Line 59, change "BO" to B0 --.
Line 61, change "FO" to F0 --.
Line 65, change "BO" to B0 --.

Column 20,
Line 4, before "vehicle" insert -- a --.
Line 15, change "speedl" to -- speed --.

Signed and Sealed this

Twenty-fifth Day of December, 2001

*Attest:*

*Attesting Officer*

JAMES E. ROGAN
*Director of the United States Patent and Trademark Office*